UNITED STATES PATENT OFFICE.

ALFRED A. LOCKWOOD, OF LONDON, ENGLAND.

PROCESS OF TREATING ORES AND CARBONIFEROUS EARTHS.

956,773. Specification of Letters Patent. Patented May 3, 1910.

No Drawing. Application filed November 15, 1909. Serial No. 528,164.

*To all whom it may concern:*

Be it known that I, ALFRED ARTHUR LOCKWOOD, chemist, a subject of the King of Great Britain, residing at 12 Minories, in the city of London, England, have invented a new and useful Process of Treating Ores and Carboniferous Earths, of which the following is a specification.

In a process for treating ores in which an ore is agitated in the presence of water with an oily liquid (by which term are included animal, vegetable and mineral oils, creosote, fatty acids, soaps and mixtures thereof, and the like,) in a manner adapted to coat the metalliferous portions of the ore to the exclusion of the gangue and subsequently separating the oiled particles by a process dependent on the difference of weight or powers of flotation between the oiled particles and the unoiled particles (hereinafter termed a flotation process), I, according to this invention employ for this purpose an oily liquid which has been made to contain minute quantities of such metallic compounds as are insoluble in water, for the purpose of rendering them less miscible or emulsifiable and more adherent to and retentive of the metalliferous or carboniferous particles. Such oily liquids allow a greater range of minerals to be effectively treated. It has been found that one advantage of the employment of such treated oily liquids arises from the fact that when finely divided metallic compounds containing oxygen such as metallic oxids, carbonates or sulfates which are insoluble in water are added to the oil they are not washed out from the oily mixture when this is agitated with water as is the case when an untreated oil is employed. This has for effect that an oily liquid containing an addition of such compounds may be utilized in such processes for example for the purpose of raising the specific gravity of the oily liquid in order that the metalliferous particles may be more easily and effectively coated or for other purposes. Such oily liquids are very adherent and in some cases (especially when slimes are present) it may be necessary to add a little acid such as sulfuric acid to prevent the water from becoming sick. Oily liquids are made to acquire these qualities by treatment in general with such substances as would with a saponifiable oil form an insoluble soap; sulfates, sulfids, chlorids, oxids or carbonates being suitable; but when a purified mineral oil, such as kerosene, is in question, there must be present in addition to the soluble salt some other substance such as a soluble soap or another oil or a metallic oxid.

Preferably the oily liquid is treated with a soluble metallic salt such as sulfate of alumina which can with a saponifiable oil produce an insoluble soap, or with a mixture of a soluble metallic salt and a metallic oxid, which can form an insoluble soap.

Example 1: An oily liquid such as oil gas tar (obtained in the manufacture of oil gas,) creosote or kerosene oil is mixed with a one to five per cent. solution of sulfate of alumina in the presence of a soluble soap. The quantity of soluble soap required is about one to five per cent. of the oil used and if an excess of alumina be used it will separate out and may be used over again.

Example 2: One part of oil gas tar is agitated with two per cent. of carbonate of lime preferably suspended in a little water. When it is desired to form a mixture which owing to its specific gravity will more rapidly coat an ore than hitherto more carbonate of lime may be added to the mixture so as to bring up its contents to say twenty per cent. Of course the oil gas tar might originally have been agitated with twenty per cent. of carbonate of lime but the quantity of lime which reacts with the oil is small. Coated metalliferous particles can be separated from the uncoated particles of an ore by a known oil and acid flotation process.

Example 3: An animal or vegetable oil is mixed with five per cent. of a five per cent. chlorid of lime milk. A metallic oxid carbonate or sulfate if added to the oily liquids produced in Examples 1 and 3 will not be washed out from the oily liquid when agitated with water.

In my application for Patent No. 504,530, filed June 26, 1909, I have claimed a process wherein the ore is agitated with a mixture comprising a magnetic oxid, water and an oily liquid which has been so treated with sulfate of alumina or the like that said oily liquid retains an oxid, and then magnetically separating the mixture, while the claims in the present application relate to a somewhat similar treatment in which the oiled particles are separated from the unoiled particles by a flotation process.

What I claim is:—

1. In a process for treating ores, agitating the ore with a mixture comprising water, an insoluble metallic compound containing oxygen and an oily liquid which has been so treated that it contains a minute quantity of a metallic compound insoluble in water for the purpose of preventing the washing out of said insoluble metallic compound, and then separating the oiled particles from the unoiled particles by a flotation process.

2. In a process for treating ores, agitating the ore in the presence of water, a metallic compound containing oxygen added to raise the specific gravity of the bath and an oily liquid which has been made to contain a minute quantity of a metallic compound insoluble in water for the purpose of preventing the washing out of the metallic compound containing oxygen, and then separating the oiled particles from the unoiled particles by a flotation process.

A. A. LOCKWOOD.

Witnesses:
MARCUS R. A. SAMUEL,
H. D. JAMESON.